United States Patent [19]
Lefever et al.

[11] Patent Number: 5,293,908
[45] Date of Patent: Mar. 15, 1994

[54] WEDGE CLAMP FOR ADJUSTABLY AFFIXING A SUPPORT BRACKET TO A WEAVING MACHINE

[75] Inventors: Bart Lefever, Ieper; Roland Dewachter, Langemark, both of Belgium

[73] Assignee: Picanol, N.V., Belgium

[21] Appl. No.: 26,313

[22] Filed: Feb. 24, 1993

[30] Foreign Application Priority Data

Feb. 27, 1992 [BE] Belgium .............................. 09200196

[51] Int. Cl.⁵ .............................................. D03D 49/22
[52] U.S. Cl. ...................................... 139/114; 403/374
[58] Field of Search ................ 139/114, 115; 403/370, 403/374; 248/412, 316.2, 231.3

[56] References Cited

U.S. PATENT DOCUMENTS

| | | |
|---|---|---|
| 4,534,386 | 8/1985 | Pfarrwaller ........................ 139/114 |
| 4,730,644 | 3/1988 | Schwarz . |
| 4,732,178 | 3/1988 | Schwarz . |
| 5,025,838 | 6/1991 | Vandeweghert et al. .......... 139/114 |

FOREIGN PATENT DOCUMENTS 0228990 7/1987 European Pat. Off. .
3317146 11/1984 Fed. Rep. of Germany .

*Primary Examiner*—Andrew M. Falik
*Attorney, Agent, or Firm*—Bacon & Thomas

[57] ABSTRACT

An apparatus for adjustably affixing a support bracket to a part of a machine frame includes an adjustment screw to adjust the height of the support bracket on the frame and a pair of oppositely movable clamp elements having oblique surfaces for wedging the support bracket in place following adjustment. Wedging is accomplished by turning a setting screw to move the clamp elements in mutually opposite directions. The setting screw is parallel to the adjustment screw, allowing equal access to both the adjustment and setting screws.

9 Claims, 3 Drawing Sheets

WEDGE CLAMP FOR ADJUSTABLY AFFIXING A SUPPORT BRACKET TO A WEAVING MACHINE

BACKGROUND OF THE INVENTION

1. Field of the Invention

The invention concerns an apparatus for adjustably affixing a support bracket or the like to a part of a machine frame, and in particular concerns an apparatus for adjustably affixing a support bracket bearing a warp deflecting roller to a lateral part of the frame of a weaving machine, the apparatus including an adjustment screw for adjusting the position of the support bracket and means for clamping the support bracket in its set position to the lateral part of the frame of the weaving machine.

2. Description of Related Art

It is known with respect to weaving machines to mount machine components, in particular a support bracket holding the support mechanism of a warp deflecting system, in a height-adjustable manner to the frame of the weaving machine by means of adjusting screws. The support bracket is secured to the machine frame by additional fasteners after positioning so as to hold it in place during weaving.

It is further known to use screw means which must be tightened very hard for the additional fastening. These screw means include several screws, which makes it difficult to operate the screw means. Moreover, the screws are frequently located in positions on the machine frame which preclude easy access.

SUMMARY OF THE INVENTION

The objective of the invention is to provide an apparatus for adjustably affixing a support bracket or the like to a part of the machine frame, and which can be operated more easily than previous such apparatuses.

This objective is achieved in a preferred embodiment of the invention by providing a guide with an undercut groove and a guide-fitting between the support bracket and the part of the machine frame to which the bracket is affixed, and by mounting at least one clamp actuated by a setting component between the support bracket and the machine frame, the clamp making it possible to press the guide fitting against a surface of the groove.

The apparatus of the preferred embodiment is easily and quickly operated because the adjustment screw and the setting component can be mounted at easily accessible places on the frame.

BRIEF DESCRIPTION OF THE DRAWINGS

Further features and advantages of the invention are elucidated in the following description of the illustrative embodiments shown in the drawing.

DETAILED DESCRIPTION OF THE PREFERRED EMBODIMENTS

Figure 1:
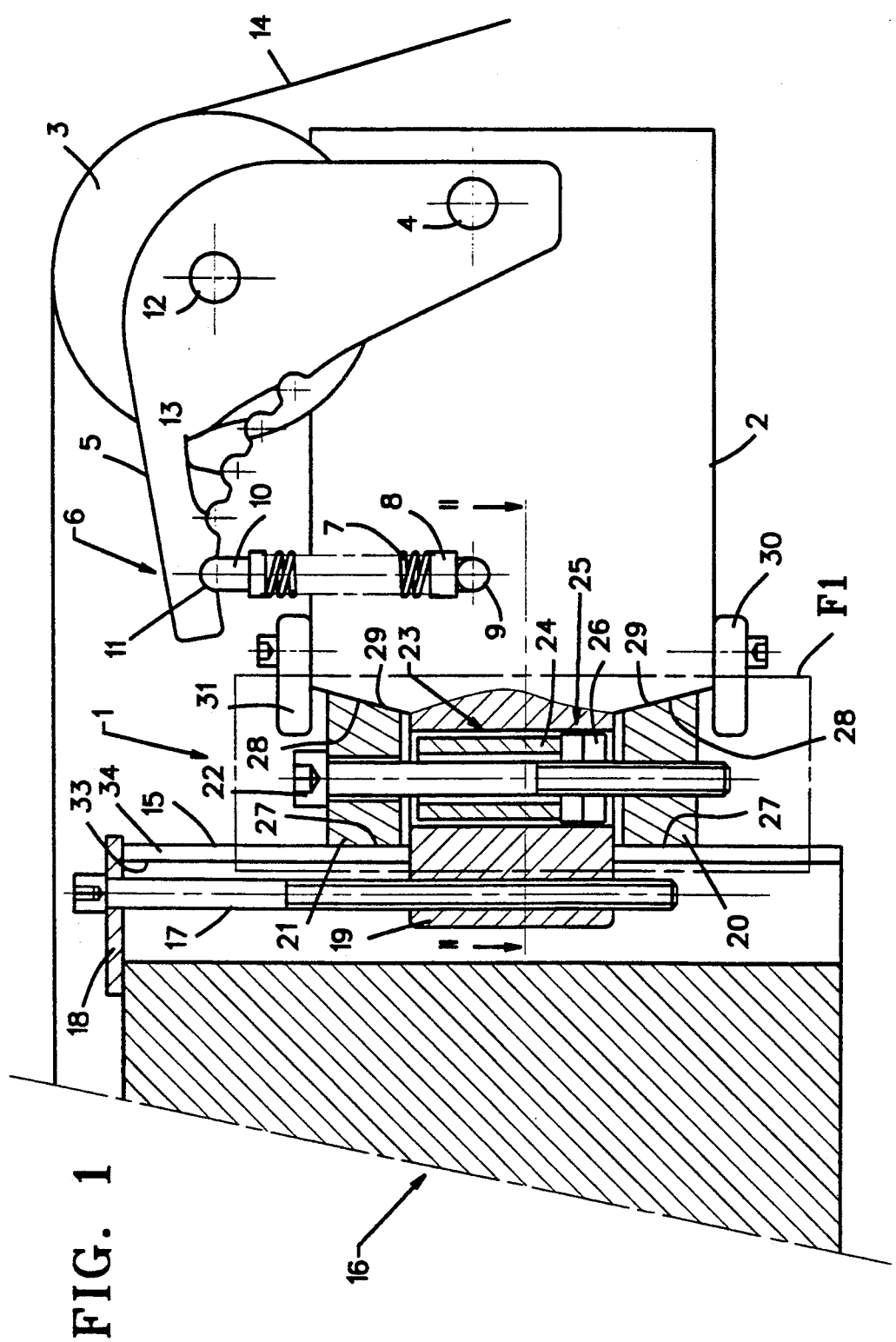
FIG. 1 is a vertical section of an apparatus of a preferred embodiment of the invention.
Figure 2:
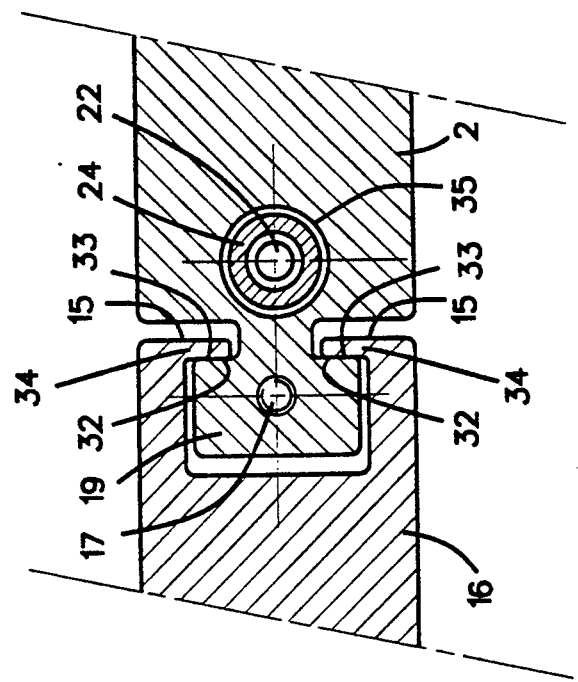
FIG. 2 is a section along line 11—11 of FIG. 1, FIGS. 3 through 6 show a detailed segment F1 of the apparatus of FIG. 1 in different positions during affixing and detaching.

FIG. 1 shows an apparatus 1 with a support mechanism for supporting a deflecting roller 3. Deflecting roller 3 supports and deflects a plurality of warps 14 supplied from a warp beam. By means of its shaft 12, the deflecting roller 3 rests on two rockers 5 which in turn rest by a pivot shaft 4 on support brackets 2. Each free arm of the two rockers 5 is biased by a compression spring 7 supported by a rest 8 on one of the support brackets 2 so as to be pivotable about a spindle 9. The compression spring 7 is connected to arm 5 by a tip 10 which fits within a notch 11 of the arm 6 of the rocker 5. The compression spring can be pivoted in such manner about the pivot shaft 9 that the tip 10 also can also be caused to fit within other notches 13, and thus provide an adjustable bias force.

Each of the two support brackets 2 can be affixed in height-adjustable manner at the end-faces of lateral parts 16 of the frame of the weaving machine. A vertical and undercut groove having edges 34 is present in the region of the end-face of the lateral part 16, the groove guiding a guide fitting 19 of the support bracket 2. Guide fitting 19 is in the shape of a hammer head. The hammer head-shaped fitting 19 rests by guide surfaces 32 facing the support bracket 2 on the matching surfaces 33 of the edges 34 of the undercut groove, and includes a thread engaged by an adjustment screw 17 within the groove, the head of the screw 17 resting on a plate 18 which forms an upper boundary of the groove and is affixed to the lateral part 16. By rotating respective adjustment screws 17, the height position of each of support brackets 2 and hence that of the deflecting roller 3 may be adjusted. The weight of the support brackets 2 and of the deflecting roller 3 is borne by the adjustment screws 17.

Two wedging clamp elements 20, 21 are provided in order to fix the support brackets 2 in the adjusted height position. The two clamp elements 20, 21 each possesses a surface 27 parallel to the end face 15 of the lateral part 16, and an oblique wedge surface 28. The oppositely oblique wedge surfaces 28 of the two clamp elements 20, 21 face corresponding oppositely oblique surfaces 29 of the support bracket 2.

The two clamp elements 20, 21 are connected by a screw 22 which acts as a setting component. The screw 22 is threaded into a thread of the clamp element 20. The head of the screw 22, which passes through a borehole in the other clamp element 21, is located on the side away from the clamp element 20.

The screw 22 passes through the support bracket 2 inside a clearance 35 which houses a drive 23 for the clamp element 21. The drive 23 consists of a shell 24 resting on a support component 25 consisting of two check nuts 26 screwed onto the screw 22. The support arm 2 is provided with stops 30, 31 limiting the excursion of the clamp elements 20, 21.

Figure 3:
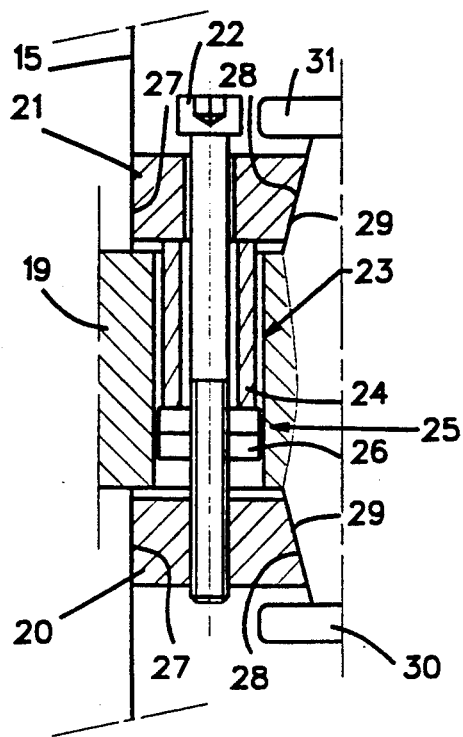
Figure 4:
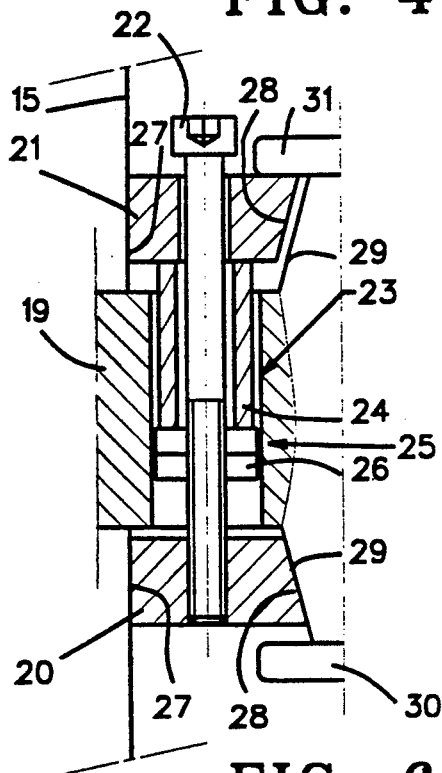
Figure 5:
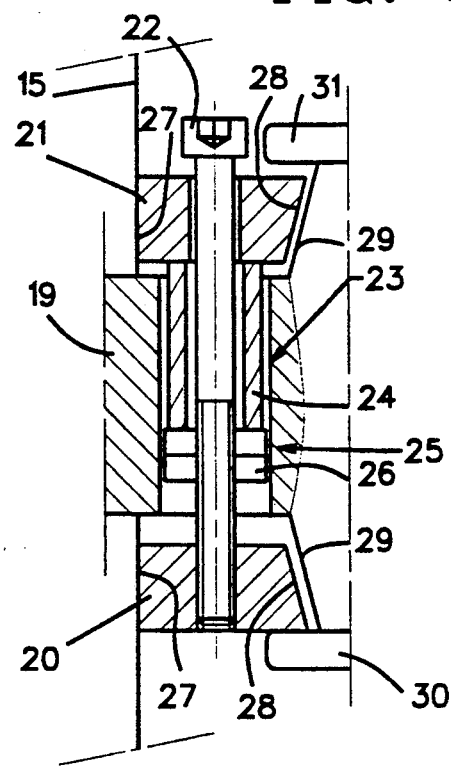
Figure 6:
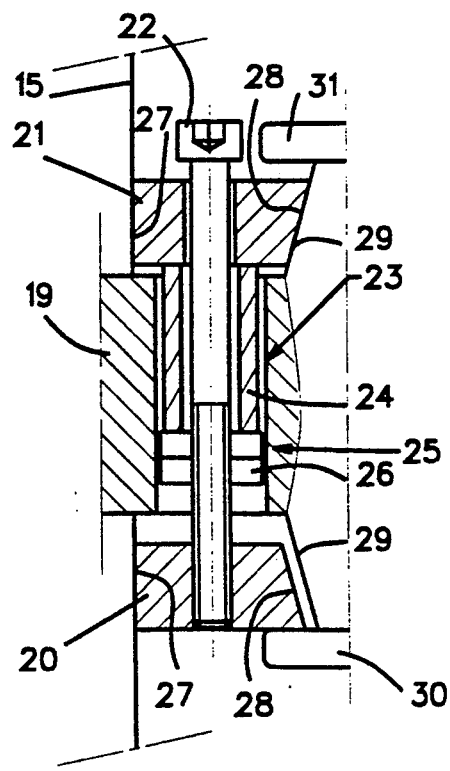

As shown in FIG. 1, the adjustment screw 17 and the setting screw 22 for the clamps 20, 21 are parallel, with both their heads being accessible from above to corresponding tools, as a result of which operation is convenient and access is easy. The position of the apparatus shown in FIG. 1 is one in which the support bracket 2 is affixed to the lateral part 16 of the machine frame, screw 22 having been tighted to hold the two clamp elements 20, 21 in the clamping position. In this position, the clamp elements 20, 21 ensure that the surfaces 32 of the guide fitting 19 of the support bracket are reliably pressed against the matching surfaces 33. If now the position of the support bracket 2 must be changed in height, then the setting components, namely the screws 22, must first be loosened. This loosening results in the position of the clamps shown in FIG. 3, wherein the driver 23 has traveled so far that the free edge of the shell 24 rests now against the clamp element 21. If the screw 22 is rotated further in the loosening direction, the clamp element 21 will be moved by the screw to the position shown in FIG. 4. As soon as the clamp 21 makes contact with the stop 31, further rotation of the screw 22 will loosen the clamp. Similarly, if the clamp 20 is loosened first, then clamp 20 will come to rest against the stop 30 (FIG. 6). Further rotation of the screw 22 results in loosening the opposite clamp element 21, and hence, in both cases, a position is reached in which the wedge surfaces 28 of the two clamp elements 20, 21 are detached from the opposite surfaces 29 of the support bracket 2 (FIG. 5). When in this position, the support brackets can be changed in their height by rotating the adjustment screws 17. Thereupon the height position is fixed in place by tightening the screw 22 acting as a setting means for the clamps 20, 21.

Figure 7:
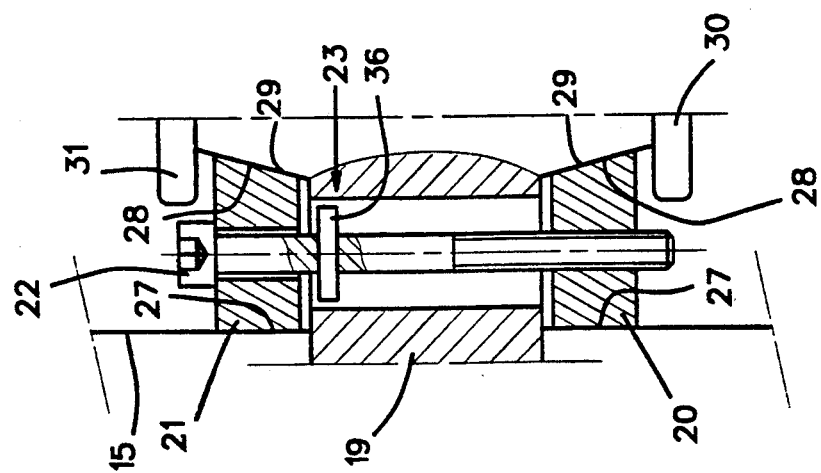
FIG. 7 is a section similar to that of FIG. 1 of a modification of the apparatus of FIGS. 1-3.

FIG. 7 shows another embodiment of the invention, with a simplified design for a driver of the clamp element 21 in that the driver 23 of this embodiment consists of a cross-pin 36 inserted into a cross-borehole of the screw 22.

In another variation of the apparatus of the invention, the screw 22 may be provided with two oppositely running thread segments associated with the respective clamp elements 20, 21.

Furthermore, as a modification of the above embodiments, other clamps may also be used, in particular clamps which are not moved into the detached or clamped positions by being shifted axially relative to each other, but instead by rotation. For example, an eccentric roller may be mounted parallel to the adjustment screw 17 in the guide fitting 19, the roller also being actuated by a setting component parallel to the adjustment screw 17.

Each of the above variations and modifications maintains the advantage of the present invention is that the adjustment screw 17 and the setting element (screw 22) are accessible from almost the same location and hence simple and convenient operation is made possible. Numerous other such modifications of the invention will undoubtedly occur to those skilled in the art, and thus those skilled in the art will appreciate that the invention should not be limited by the above description or illustrations, but rather it is intended that the invention be limited solely by the appended claims.

I claim:

1. In an apparatus for adjustably affixing a support bracket to a machine frame, comprising means including an adjustment screw for adjusting a position of the support bracket, and means for fixing the support bracket in the adjusted position to the machine frame, the improvement comprising:
    a guide having an undercut groove and a guide fitting provided between the support bracket and the machine frame part, wherein said fixing means includes at least one clamp element and means including a setting component mounted between the support bracket and the machine frame for driving the clamp element in order to press the guide fitting against a surface of the groove.

2. Apparatus as claimed in claim 1, wherein the setting component for the clamp element is mounted parallel to the adjustment screw.

3. Apparatus as claimed in claim 1, wherein the position of the support bracket is adjustable by said adjustment screw in an adjustment direction, and the clamp element is a wedge clamp arranged to be driven by the setting component in said adjustment direction.

4. Apparatus as claimed in claim 1, wherein the clamp element is a wedge clamp element mounted between an end face of the machine-frame and the support bracket, said clamp element comprising one surface which is parallel to the end face and one wedge surface which faces an oblique surface of the support bracket.

5. Apparatus as claimed in claim 4, further comprising a second mutually opposite wedge clamp element, said clamp elements being arranged to be driven in a mutually opposite directions by the setting component.

6. Apparatus as claimed in claim 5, further comprising stop means on the support bracket for limiting a distance by which the clamp elements are be driven in mutually opposite directions by the setting component.

7. Apparatus as claimed in claim 5, wherein the setting component is a setting screw arranged to allow mutual tightening of the two clamp elements.

8. Apparatus as claimed in claim 7, wherein the setting screw is threaded into a thread of the first clamp and comprises a driver rigidly joined to, said driver being arranged to engage the second clamp element and thereby drive it.

9. Apparatus as claimed in claim 8, wherein the support bracket is arranged to support a warp deflecting roller in a weaving machine, the support bracket being mounted to a lateral part of the machine frame.

* * * * *